(12) United States Patent
Shi (10) Patent No.: US 11,140,721 B2
(45) Date of Patent: Oct. 5, 2021

(54) RANDOM ACCESS METHOD AND DEVICE

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/932,598

(22) Filed: Jul. 17, 2020

(65) Prior Publication Data
US 2020/0351951 A1 Nov. 5, 2020

Related U.S. Application Data

(63) Continuation of application No. PCT/CN2018/081459, filed on Mar. 30, 2018.

(51) Int. Cl.
*H04W 74/08* (2009.01)
*H04W 72/04* (2009.01)

(52) U.S. Cl.
CPC ... *H04W 74/0833* (2013.01); *H04W 72/0453* (2013.01)

(58) Field of Classification Search
CPC ............... H04W 74/0833; H04W 72/0453
See application file for complete search history.

(56) References Cited

U.S. PATENT DOCUMENTS

| 10,813,137 | B2 * | 10/2020 | Shih | ............... H04W 16/32 |
| 2019/0150172 | A1 * | 5/2019 | Ang | ............... H04L 5/0053 |
| | | | | 370/329 |
| 2019/0182870 | A1 * | 6/2019 | Shih | ............... H04W 74/004 |
| 2019/0208548 | A1 * | 7/2019 | Shih | ............... H04W 24/10 |
| 2019/0215869 | A1 * | 7/2019 | Lin | ............... H04L 5/001 |
| 2019/0223227 | A1 * | 7/2019 | Jiang | ............... H04W 48/16 |
| 2019/0253531 | A1 * | 8/2019 | Basu Mallick | ...... H04W 28/20 |
| 2020/0221499 | A1 * | 7/2020 | Hofstrom | ......... H04W 24/08 |
| 2020/0288494 | A1 * | 9/2020 | Heo | ............... H04W 72/1278 |

FOREIGN PATENT DOCUMENTS

| CN | 101873711 A | 10/2010 |
| CN | 101883398 A | 11/2010 |
| CN | 102238720 A | 11/2011 |
| CN | 107018538 A | 8/2017 |

(Continued)

OTHER PUBLICATIONS

Guangdong OPPO Mobile Telecommunications Corp. Ltd., International Search Report and Written Opinion, PCT/CN2018/081459, dated Dec. 29, 2018, 9 pgs.

(Continued)

*Primary Examiner* — Rasheed Gidado
(74) *Attorney, Agent, or Firm* — Morgan, Lewis & Bockius LLP (57) ABSTRACT

Disclosed in embodiments of the present application are a random access method and device. The method comprises: a terminal device determining a target uplink bandwidth part (BWP) and/or a target downlink BWP for random access; and the terminal device initiating a contention-based random access on the target uplink BWP and/or the target downlink BWP.

12 Claims, 4 Drawing Sheets

200

Determine, by a terminal device, a target uplink BandWidth Part (BWP) and/or a target downlink BWP for random access — S210

Perform, by the terminal device, a contention-based random access on the target uplink BWP and/or the target downlink BWP — S220

(56) References Cited

FOREIGN PATENT DOCUMENTS

EP          3685623 A1    7/2020
RU      2010121934 A     12/2011

OTHER PUBLICATIONS

Ericsson, "Summary of BWP Linkage for Random Access," 3GPP TSG-RAN WG2 #101, Tdoc R2-1803871, Athens, Greece, Feb. 26-Mar. 2, 2018, 4 pgs.
Guangdong OPPO Mobile Telecommunications Corp. Ltd., Extended European Search Report, EP18912134.6, dated Nov. 5, 2020, 11 pgs.
Institute for Information Industry (III), The impact of BWP configuration and switching, 3GPP TSG-RAN WG2 NR Ad hoc 1801, R2-1800778, Vancouver, Canada, Jan. 22-Jan. 26, 2018, 5 pgs.
MediaTek Inc., BWP ambiguity for contention-based RACH procedure, 3GPP TSG-RAN WG2 Meeting #101, R2-1803061, Athens, Greece, Feb. 26-Mar. 2, 2018, 3 pgs.
Guangdong OPPO Mobile Telecommunications Corp. Ltd., Official Action, RU2020133846, dated Jul. 8, 2021, 11 pgs.

\* cited by examiner

Receive, by the terminal device, a switching instruction sent by a network device, wherein the switching instruction is used to instruct to switch a currently active first BandWidth Part (BWP) to a second BWP, and the first BWP and the second BWP are uplink BWPs or downlink BWPs ⎯ S510

Simultaneously switch, by the terminal device, a currently active uplink BWP and a currently active downlink BWP for the terminal device according to a first mapping relationship, wherein the first mapping relationship is used to determine a BWP to which the second BWP is mapped ⎯ S520

RANDOM ACCESS METHOD AND DEVICE

CROSS-REFERENCE TO RELATED APPLICATIONS

This application is a continuation of PCT Application No. PCT/CN2018/081459, entitled "RANDOM ACCESS METHOD AND DEVICE" filed Mar. 30, 2018, which is incorporated herein by reference in its entirety.

TECHNICAL FIELD

Embodiments of the present disclosure generally relate to communication technologies, and more particularly, to methods and devices for random access.

BACKGROUND

In discussions of the 5G New Radio (NR) system, it is determined that the system bandwidth supported by the NR system is much larger than the system bandwidth of the Long Term Evolution (LTE) system. However, for some terminal devices, due to their limited capability, they cannot support the entire system bandwidth. Therefore, the concept of BandWidth Part (BWP) was introduced into the NR system. The bandwidth of each BWP is smaller than or equal to the maximum bandwidth.

A network device may configure one or more uplink BWPs for a terminal device, and may also configure one or more downlink BWPs for the terminal device, but there can be at most one active downlink BWP and one active uplink BWP at a time.

After the terminal device initiates random access on the currently active uplink BWP, the network device does not necessarily send a Random Access Response (RAR) on the currently active downlink BWP. Therefore, how to perform random access is an issue worth studying.

SUMMARY

A random access method and device are provided to increase the probability of success for random access.

According to a first aspect, there is provided a method for random access, including:

determining, by a terminal device, a target uplink BandWidth Part (BWP) and/or a target downlink BWP for random access; and performing, by the terminal device, a contention-based random access on the target uplink BWP and/or the target downlink BWP.

Therefore, when the terminal device wants conduct random access, the target uplink BWP and/or the target downlink BWP for the random access can be determined, so that the uplink BWP and the downlink BWP used by the terminal device to perform random access can be a pair of BWPs on which the terminal device and a network device agree, and this is helpful to increase the probability for the terminal device to successfully receive the RAR, and can thus increase the probability of successful random access.

According to an exemplary embodiment, the target downlink BWP may be a downlink BWP to which a currently active uplink BWP for the terminal device is mapped, or an initial downlink BWP, or a currently active downlink BWP, which is not limited in embodiments of the present disclosure.

For example, when the currently active uplink BWP and the currently active downlink BWP are BWPs which have a mapping relationship with each other, the terminal device may determine not to perform downlink BWP switching; or, when the currently active downlink BWP is the initial downlink BWP, the terminal device may not perform BWP switching; or, when the currently active uplink BWP is the initial uplink BWP and the currently active downlink BWP is not the initial downlink BWP, the terminal device may switch the currently active downlink BWP to the initial downlink BWP.

According to an exemplary embodiment, the target uplink BWP may be the initial uplink BWP or the currently active uplink BWP, which is not limited in embodiments of the present disclosure.

For example, when the currently active uplink BWP and the currently active downlink BWP are BWPs which have a mapping relationship with each other, the terminal device may determine not to perform uplink BWP switching; or, when the currently active uplink BWP is the initial uplink BWP, the terminal device may not perform BWP switching; or, when the currently active downlink BWP is the initial downlink BWP and the currently active uplink BWP is not the initial uplink BWP, the terminal device may switch the currently active uplink BWP to the initial uplink BWP.

According to an exemplary embodiment, determining, by a terminal device, a target uplink BWP and/or a target downlink BWP for random access includes:

determining, by the terminal device, the target downlink BWP according to a currently active first uplink BWP.

For example, the downlink BWP to which the currently active uplink BWP is mapped may be determined as the target downlink BWP; or the terminal device may also re-determine a set of uplink and downlink BWPs which have a linkage (or association) with each other as the target uplink BWP and the target downlink BWP, that is, the terminal device switches the currently active uplink and downlink BWPs to a set of uplink and downlink BWPs which have a linkage with each other, and then performs random access.

According to an exemplary embodiment, determining, by the terminal device, the target downlink BWP according to a currently active first uplink BWP includes:

determining, by the terminal device, the target downlink BWP according to the first uplink BWP and a first mapping relationship, wherein the first mapping relationship is used to determine a downlink BWP to which the first uplink BWP is mapped.

According to an exemplary embodiment, determining, by the terminal device, the target downlink BWP according to the first uplink BWP and a first mapping relationship includes:

when it is determined that the first uplink BWP is not mapped to any downlink BWP according to the first mapping relationship, determining, by the terminal device, an initial downlink BWP as the target downlink BWP.

According to an exemplary embodiment, determining, by the terminal device, the target downlink BWP according to the first uplink BWP and a first mapping relationship includes:

when it is determined that the first uplink BWP is mapped to a first downlink BWP according to the first mapping relationship, and the first downlink BWP is not a currently active downlink BWP for the terminal device, determining, by the terminal device, the first downlink BWP as the target downlink BWP.

According to an exemplary embodiment, determining, by the terminal device, the target downlink BWP according to the first uplink BWP and a first mapping relationship includes:

when it is determined that the first uplink BWP is mapped to a first downlink BWP according to the first mapping relationship, and the first downlink BWP is not a currently active downlink BWP for the terminal device, determining, by the terminal device, an initial downlink BWP as the target downlink BWP.

According to an exemplary embodiment, determining, by a terminal device, a target uplink BWP and/or a target downlink BWP for random access includes:

determining, by the terminal device, a currently active downlink BWP as the target downlink BWP.

According to an exemplary embodiment, determining, by a terminal device, a target uplink BWP and/or a target downlink BWP for random access includes:

determining, by the terminal device, a currently active uplink BWP or an initial uplink BWP as the target uplink BWP.

According to an exemplary embodiment, the method further includes:

receiving, by the terminal device, a first switching instruction sent by a network device, wherein the first switching instruction is used to instruct the terminal device to switch a currently active first uplink BWP to a second uplink BWP;

according to the first mapping relationship, determining, by the terminal device, a downlink BWP to which the second uplink BWP is mapped;

switching, by the terminal device, the currently active first uplink BWP to the second uplink BWP, and switching a currently active downlink BWP to the downlink BWP to which the second uplink BWP is mapped.

According to an exemplary embodiment, the method further includes:

receiving, by the terminal device, a second switching instruction sent by a network device, wherein the second switching instruction is used to instruct to switch a currently active first downlink BWP to a second downlink BWP;

according to the first mapping relationship, determining, by the terminal device, an uplink BWP to which the second downlink BWP is mapped;

switching, the terminal device, the currently active first downlink BWP to the second downlink BWP, and switching a currently active uplink BWP to the uplink BWP to which the second downlink BWP is mapped.

Therefore, when the terminal device performs BWP switching, the terminal device can simultaneously switch uplink and downlink BWPs according to the first mapping relationship, so as to maintain the simultaneously activated uplink BWP and downlink BWP as the BWPs which have a mapping relationship with each other, and increase the probability of successful RAR reception.

According to an exemplary embodiment, the first mapping relationship is a mapping relationship between uplink BWPs and downlink BWPs.

According to an exemplary embodiment, the first mapping relationship is a mapping relationship between BWP indices of the uplink BWPs and BWP indices of the downlink BWPs.

According to an exemplary embodiment, when the number of the uplink BWPs and the number of the downlink BWPs are equal, the BWP indices K of the uplink BWPs are mapped to the BWP indices k of the downlink BWPs, where K and k are both integers and K=k.

According to an exemplary embodiment, when the number of uplink BWPs is greater than the number of downlink BWPs, the BWP indices K of the uplink BWPs are mapped to the BWP indices k of the downlink BWPs, where K and k are both integers, k is a result of K modulo M, and M is the number of downlink BWPs configured by a network device.

According to an exemplary embodiment, wherein the first mapping relationship is a mapping relationship between random access resources configured on uplink BWPs and downlink BWPs.

According to an exemplary embodiment, the first mapping relationship is a mapping relationship between the random access resources and BWP indices of the downlink BWPs.

According to an exemplary embodiment, perform, by the terminal device, a contention-based random access on the target uplink BWP and/or the target downlink BWP includes:

sending, by the terminal device, a random access preamble on the target uplink BWP through a random access resource configured on the target uplink BWP; and receiving, by the terminal device, a Random Access Response (RAR) sent by a network device on the target downlink BWP.

According to an exemplary embodiment, the method further includes:

when a currently active downlink BWP for the terminal device is different from the target downlink BWP, switching, by the terminal device, the currently active downlink BWP to the target downlink BWP.

According to a second aspect, there is provided a method for random access, including:

receiving, by the terminal device, a switching instruction sent by a network device, wherein the switching instruction is used to instruct to switch a currently active first Band-Width Part (BWP) to a second BWP, and the first BWP and the second BWP are uplink BWPs or downlink BWPs; and simultaneously switching, by the terminal device, a currently active uplink BWP and a currently active downlink BWP for the terminal device according to a first mapping relationship, wherein the first mapping relationship is used to determine a BWP to which the second BWP is mapped.

Therefore, when the terminal device performs BWP switching, the terminal device can simultaneously switch uplink and downlink BWPs according to the first mapping relationship, so as to maintain the simultaneously activated uplink BWP and downlink BWP as the BWPs which have a mapping relationship with each other, and increase the probability of successful RAR reception.

According to an exemplary embodiment, simultaneously switching, by the terminal device, a currently active uplink BWP and a currently active downlink BWP for the terminal device according to a first mapping relationship includes:

when the first BWP and the second BWP are uplink BWPs, switching, by the terminal device, the currently active uplink BWP from the first BWP to the second BWP, and switching the currently active downlink BWP to a downlink BWP to which the second BWP is mapped.

According to an exemplary embodiment, simultaneously switching, by the terminal device, a currently active uplink BWP and a currently active downlink BWP for the terminal device according to a first mapping relationship includes:

when the first BWP and the second BWP are downlink BWPs, switching, by the terminal device, the currently active downlink BWP from the first BWP to the second BWP, and switching the currently active uplink BWP to an uplink BWP to which the second BWP is mapped.

According to an exemplary embodiment, the first mapping relationship is a mapping relationship between uplink BWPs and downlink BWPs.

According to an exemplary embodiment, the first mapping relationship is a mapping relationship between BWP indices of the uplink BWPs and BWP indices of the downlink BWPs.

According to an exemplary embodiment, when the number of the uplink BWPs and the number of the downlink BWPs are equal, the BWP indices K of the uplink BWPs are mapped to the BWP indices k of the downlink BWPs, where K and k are both integers and K=k.

According to an exemplary embodiment, when the number of uplink BWPs is greater than the number of downlink BWPs, the BWP indices K of the uplink BWPs are mapped to the BWP indices k of the downlink BWPs, where K and k are both integers, k is a result of K modulo M, and M is the number of downlink BWPs configured by a network device.

According to an exemplary embodiment, the first mapping relationship is a mapping relationship between random access resources configured on uplink BWPs and downlink BWPs.

According to an exemplary embodiment, the first mapping relationship is a mapping relationship between the random access resources and BWP indices of the downlink BWPs.

According to a third aspect, there is provided a device for random access. The device is configured to perform the methods according to the first aspect or any of the exemplary embodiments of the first aspect. In particular, the device includes units for performing the methods according to the first aspect or any of the exemplary embodiments of the first aspect.

According to a fourth aspect, there is provided a device for random access. The device includes a memory, a processor, an input interface and an output interface. The memory, the processor, the input interface and the output interface are connected through a bus system. The memory is configured to store instructions, and the processor is configured to execute the instructions stored in the memory to perform the methods according to the first aspect or any of the exemplary embodiments of the first aspect.

According to a fifth aspect, there is provided a device for random access. The device is configured to perform the methods according to the second aspect or any of the exemplary embodiments of the second aspect. In particular, the device includes units for performing the methods according to the second aspect or any of the exemplary embodiments of the second aspect.

According to a sixth aspect, there is provided a device for random access. The device includes a memory, a processor, an input interface and an output interface. The memory, the processor, the input interface and the output interface are connected through a bus system. The memory is configured to store instructions, and the processor is configured to execute the instructions stored in the memory to perform the methods according to the second aspect or any of the exemplary embodiments of the second aspect.

According to a seventh aspect, there is provided a computer storage medium. The computer storage medium is configured to store computer software instructions for performing the methods according to the first aspect or any of the exemplary embodiments of the first aspect. The instructions include programs for performing the above design.

According to an eighth aspect, there is provided a computer program product including instructions, which when executed on a computer, cause the computer to perform the methods according to the first aspect or any of the exemplary embodiments of the first aspect.

According to a ninth aspect, there is provided a computer storage medium. The computer storage medium is configured to store computer software instructions for performing the methods according to the second aspect or any of the exemplary embodiments of the second aspect. The instructions include programs for performing the above design.

According to a tenth aspect, there is provided a computer program product including instructions, which when executed on a computer, cause the computer to perform the methods according to the second aspect or any of the exemplary embodiments of the second aspect.

DETAILED DESCRIPTION

The technical solutions in embodiments of the present disclosure will be described below with reference to drawings.

The technical solutions of embodiments of the present disclosure may be applied to various communication systems, for example, Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX)) communication system, or future 5G system, etc.

Figure 1:
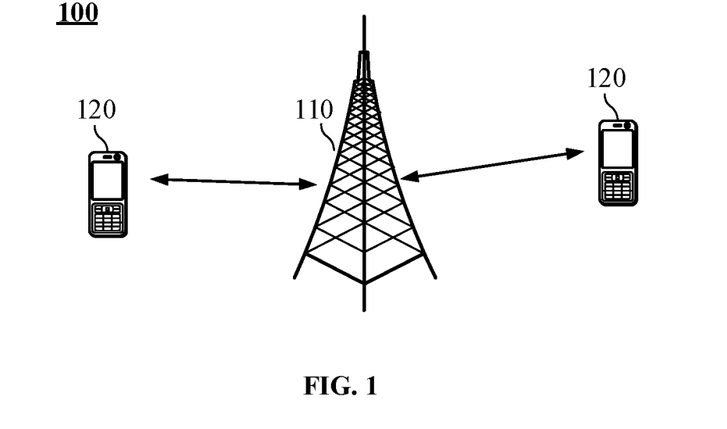
FIG. 1 shows a schematic diagram of an application scenario according to an embodiment of the present disclosure.

FIG. 1 shows a wireless communication system 100 applied in an embodiment of the present disclosure. The wireless communication system 100 may include a network device 110. The network device 100 may be a device that communicates with a terminal device. The network device 100 can provide communication coverage for a specific geographic area, and can communicate with terminal devices (e.g., UEs) within the coverage area. According to an exemplary embodiment, the network device 100 may be an Evolutional Node B (eNB or eNodeB) in an LTE system, or a wireless controller in a Cloud Radio Access Network (CRAN), or the network device may be a relay station, an access point, a vehicle-mounted device, a wearable device, a network-side device in a future 5G network, or a network device in a future evolutional Public Land Mobile Network (PLMN).

The wireless communication system 100 further includes at least one terminal device 120 within the coverage of the network device 110. The terminal device 120 may be mobile or fixed. According to an exemplary embodiment, the terminal device 120 may refer to an access terminal, User Equipment (UE), a user unit, a user station, a mobile station, a mobile terminal, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), or a handheld device having wireless communication functions, a computing device or other processing device connected to wireless modems, an in-vehicle device, a wearable device, a terminal device in future 5G networks or a terminal device in a future evolutional PLMN, etc.

Alternatively, the 5G system or network may also be referred to as a New Radio (NR) system or network.

According to an exemplary embodiment, the wireless communication system 100 may further include other network entities such as a network controller and a mobility management entity, and embodiments of the present disclosure do not impose specific limitations on this.

FIG. 1 schematically shows one network device and two terminal devices. According to other embodiments, the wireless communication system 100 may include multiple network devices and each network device may include other numbers of terminal devices within the coverage area, and embodiments of the present disclosure do not impose specific limitations on this.

Random access technology is the primary content of communication between a terminal device and a network device in a mobile communication system. The terminal device in the wireless cellular network can initiate a connection request to the network side through a random access process.

For easy understanding, a brief introduction to the random access process is provided below. The random access process mainly includes the following steps:

In S1, first, a random access preamble is transmitted. The network device may correctly estimate the transmission delay of the terminal device by the random access preamble, and solve the conflict problem when multiple terminal devices simultaneously initiate access requests. The random access preamble may also be called Msg1.

In S2, the network device sends a Random Access Response (RAR) to the terminal device. The RAR includes the transmission delay required for uplink synchronization and current access overload status of the system. In addition, the network device may also send to the terminal device the location information of the uplink resource allocated to the terminal device.

In S3, the terminal device sends a message corresponding to the random access event and the terminal device identifier of the terminal device itself on the designated uplink resource.

In S4, the network device sends conflict resolution information to the terminal device.

Figure 2:
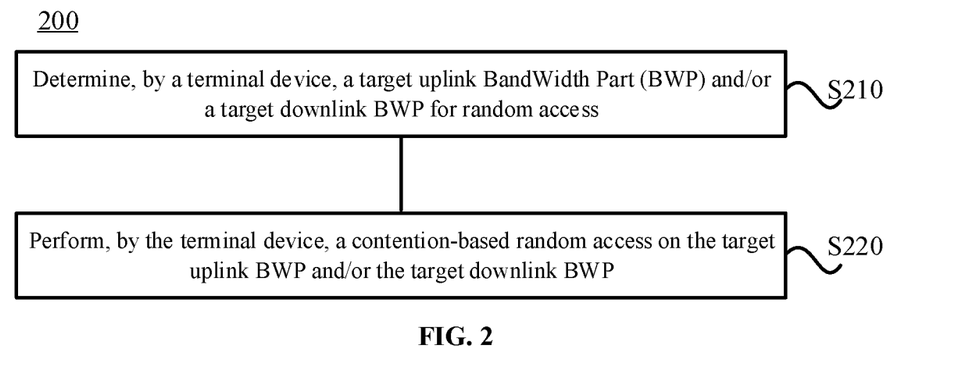
FIG. 2 shows a schematic flowchart of a method for random access according to an embodiment of the present disclosure.

FIG. 2 is a schematic flowchart of a method 200 for random access according to an embodiment of the present disclosure. The method 200 may be executed by a terminal device in a communication system. As shown in FIG. 2, the method 200 includes the following steps:

In S210, the terminal device determines a target uplink BandWidth Part (BWP) and/or a target downlink BWP for random access.

In S220, the terminal device performs a contention-based random access on the target uplink BWP and/or the target downlink BWP.

In the embodiment of the present disclosure, when the terminal device wants to perform random access, the terminal device may determine the target uplink BWP and/or target downlink BWP for random access. According to embodiments, the uplink BWP and the downlink BWP used by the terminal device for random access may be a pair of BWPs on which the terminal device and the network device can reach an agreement. Therefore, when the terminal device sends the random access preamble on a random access resource (that is, Physical Random Access Channel (PRACH) resource) configured on the uplink BWP, the network device can reply RAR on the corresponding downlink BWP. Accordingly, the terminal device can receive the RAR on the corresponding downlink BWP. In this way, the embodiment can increase the probability for the terminal device to successfully receive the RAR, and can thus increase the probability of successful random access.

In some embodiments, the uplink BWP and the downlink BWP may have a mapping relationship with each other. Therefore, the terminal device may determine the target downlink BWP for random access according to the currently active uplink BWP. For example, the downlink BWP to which the currently active uplink BWP is mapped may be determined as the target downlink BWP. Alternatively, the terminal device may also re-determine a set of mapped uplink and downlink BWPs as the target uplink BWP and the target downlink BWP, that is, to switch the currently active uplink and downlink BWPs to a set of uplink and downlink BWPs having a mapping relationship with each other, and then perform random access.

For example, when the currently active uplink BWP for the terminal device is uplink BWP1, the currently active downlink BWP is downlink BWP0, and the downlink BWP to which the uplink BWP1 is mapped is downlink BWP1, that is, the currently active uplink BWP and downlink BWP do not have a mapping relationship, the terminal device can switch the currently active downlink BWP to the downlink BWP1, and then perform random access, or the terminal device can switch the currently active uplink BWP to the uplink BWP2, and switch the currently active downlink BWP to the downlink BWP2, and then perform random access. The uplink BWP2 and the downlink BWP2 are BWPs having a mapping relationship with each other.

In some embodiments, the target downlink BWP may be a downlink BWP to which the currently active uplink BWP for the terminal device is mapped, or the initial downlink BWP, or the currently active downlink BWP, and embodiments of the present disclosure do not impose specific limitations on this.

For example, when the currently active uplink BWP and downlink BWP are BWPs with a mapping relationship with each other, in this case, the terminal device may determine not to perform downlink BWP switching; or, when the currently active downlink BWP is the initial downlink BWP, in this case, the terminal device may not perform BWP switching; or, when the currently active uplink BWP is the initial uplink BWP and the currently active downlink BWP is not the initial downlink BWP, the terminal device may switch the currently active downlink BWP to the initial downlink BWP, etc.

In some embodiments, the target uplink BWP may be the initial uplink BWP or the currently active uplink BWP, and embodiments of the present disclosure do not impose specific limitations on this.

For example, when the currently active uplink BWP and downlink BWP are BWPs with a mapping relationship with each other, in this case, the terminal device may determine not to perform the uplink BWP switching; or, when the currently active uplink BWP is the initial uplink BWP, in this case, the terminal device may not perform BWP switching; or, when the currently active downlink BWP is the initial downlink BWP and the currently active uplink BWP is not the initial uplink BWP, the terminal device may switch the currently active uplink BWP to the initial uplink BWP, and so on.

The determination of the target downlink BWP will be described in detail below.

In some embodiments, the S210 may include: determining, by the terminal device, the target downlink BWP according to a currently active first uplink BWP.

For example, when the currently active uplink BWP is the first uplink BWP, and the first uplink BWP may be mapped to a first downlink BWP, the terminal device may determine that the first downlink BWP is the target downlink BWP. Further, the currently active downlink BWP can be switched to the first downlink BWP. At this time, the simultaneously active uplink BWP and the downlink BWP have a mapping relationship. The terminal device sends Msg1 on the first uplink BWP, and the RAR is received on the first downlink BWP to which the first uplink BWP is mapped. For the network device, when Msg1 is received on the first uplink BWP, the RAR can be sent on the first downlink BWP corresponding to the first uplink BWP. That is, agreement about the downlink BWP for sending the RAR can be reached by the terminal device and the network device. This is helpful to increase the probability for the terminal device to successfully receive the RAR.

For another example, when the currently active first uplink BWP is the initial uplink BWP, the terminal device may determine the initial downlink BWP as the target downlink BWP, or may also determine not to perform the downlink BWP switching, that is, the terminal device may perform random access by keep on currently active downlink BWP.

It should be understood that the first downlink BWP corresponding to the first uplink BWP may be an initial downlink BWP, or may be a non-initial downlink BWP, and embodiments of the present disclosure do not impose specific limitations on this.

In some embodiments, determining, by the terminal device, the target downlink BWP according to a currently active first uplink BWP includes:

determining, by the terminal device, the target downlink BWP according to the first uplink BWP and a first mapping relationship, wherein the first mapping relationship is used to determine a downlink BWP to which the first uplink BWP is mapped.

In embodiments of the present disclosure, the uplink BWP and the downlink BWP may have a certain mapping relationship. For example, the mapping relationship between the uplink BWP and the downlink BWP may be a one-to-one relationship, or a one-to-many relationship, or a many-to-one relationship, or a many-to-many relationship, and so on, and embodiments of the present disclosure do not impose specific limitations on this.

For example, one downlink BWP may correspond to one uplink BWP, or one downlink BWP may correspond to multiple uplink BWPs, or some uplink BWPs do not correspond to any downlink BWP, or some downlink BWPs do not correspond to any uplink BWP, etc., and embodiments of the present disclosure do not impose specific limitations on this.

In embodiments of the present disclosure, the first mapping relationship may be specified by a communication system, or configured by a network device, or preset on the terminal device, etc., and embodiments of the present disclosure do not impose specific limitations on this.

In embodiments of the present disclosure, the first mapping relationship may be used to determine the mapping relationship between uplink BWPs and downlink BWPs, that is, the downlink BWP to which a certain uplink BWP is mapped may be determined according to the first mapping relationship, or the uplink BWP to which is certain downlink BWP is mapped may be determined according to the first mapping relationship determined according to the first mapping relationship.

In an exemplary embodiment, the first mapping relationship is a mapping relationship between uplink BWPs and downlink BWPs, that is, the first mapping relationship may directly indicate the mapping relationship between the uplink BWPs and the downlink BWPs.

For example, the first mapping relationship may be a mapping relationship between identifiers of uplink BWPs and identifiers of downlink BWPs. For example, the identifier of a BWP may be a BWP index, or other identification information that can uniquely identify the BWP, and embodiments of the present disclosure do not impose specific limitation on this.

According to embodiments, the first mapping relationship may be a mapping relationship between BWP indices of the uplink BWPs and BWP indices of the downlink BWPs.

According to embodiments, when the number of the uplink BWPs and the number of the downlink BWPs are equal, the BWP indices K of the uplink BWPs are mapped to the BWP indices k of the downlink BWPs, where K and k are both integers and K=k.

For example, an uplink BWP 1 is mapped to a downlink BWP 1, and an uplink BWP 2 is mapped to a downlink BWP 2, and so on.

According to embodiments, when the number of uplink BWPs and the number of downlink BWPs are equal, the first mapping relationship may be that BWP K of the uplink BWPs is mapped to BWP k of the downlink BWPs, where K and k are both integers, and K=M-k, M is the number of uplink BWPs or downlink BWPs.

For example, an uplink BWP 1 is mapped to a downlink BWP M, and an uplink BWP 2 is mapped to a downlink BWP M−1, and so on.

According to embodiments, when the number of uplink BWPs is greater than the number of downlink BWPs, the BWP indices K of the uplink BWPs are mapped to the BWP indices k of the downlink BWPs, where K and k are both integers, k is a result of K modulo M, and M is the number of downlink BWPs configured by a network device.

It should be understood that the number M of downlink BWPs configured by the network device may include the initial downlink BWP or may not include the initial downlink BWP, and embodiments of the present disclosure do not impose specific limitations on this. When the number M of downlink BWPs configured by the network device include the initial downlink BWP, a non-initial uplink BWP may be mapped to the initial downlink BWP after the modulo operation; when the number M of downlink BWPs configured by the network device do not include the initial downlink BWP, the non-initial uplink BWP will not be mapped to the initial downlink BWP after the modulo operation.

Figure 3:
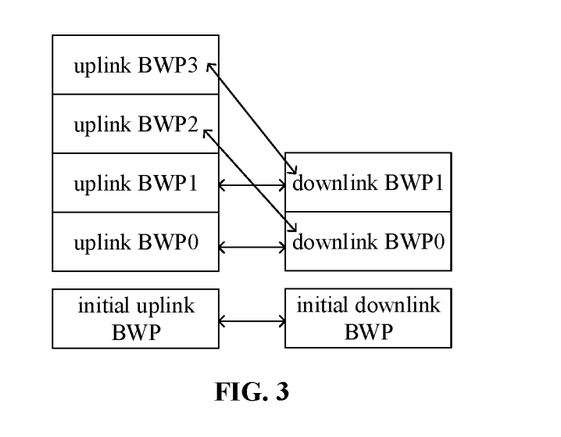
FIG. 3 shows a schematic diagram of an example of a first mapping relationship according to an embodiment of the present disclosure.

For example, as shown in FIG. 3, the uplink BWPs include BWP0 BWP3 and the initial uplink BWP, and the downlink BWPs include BWP0, BWP1 and the initial downlink BWP, the number of downlink BWPs is 2 (excluding the initial downlink BWP). According to the above mapping rule, the uplink BWP0 can be mapped to downlink BWP0, the uplink BWP1 can be mapped to the downlink BWP1, the uplink BWP2 can be mapped to the downlink BWP0, and the uplink BWP3 can be mapped to the downlink BWP1. For example, the initial uplink BWP may be mapped to the initial downlink BWP.

As another example, the uplink BWPs includes BWP1~BWP3 and the initial uplink BWP (the index of the initial downlink BWP is recorded as 0), the downlink BWPs include BWP1, BWP2 and the initial downlink BWP, and the number of downlink BWPs is 3 (including the initial downlink BWP, the index of the initial downlink BWP is recorded as 0). According to the above mapping rule, the uplink BWP1 can be mapped to the downlink BWP1, the uplink BWP2 is mapped to the downlink BWP2, the uplink BWP3 is mapped to the initial downlink BWP, and the initial uplink BWP is also mapped to the initial downlink BWP.

In some embodiments, the first mapping relationship is a mapping relationship between downlink BWPs and random access resources configured on uplink BWPs.

Therefore, the terminal device can determine to which downlink BWP the PRACH resource configured on the currently active uplink BWP is mapped, and can therefore determine the mapped downlink BWP as the target downlink BWP. Correspondingly, according to the PRACH resource used for sending Msg1 by the terminal and the first mapping relationship, the network device sends the RAR on the downlink BWP to which the PRACH resource is mapped. In this way, the terminal device and the network device can reach an agreement on the downlink BWP for sending the RAR, which is helpful for increasing the probability for the terminal device to successfully receive the RAR.

According to embodiments, the first mapping relationship is a mapping relationship between the random access resources and BWP indices of the downlink BWPs.

That is, a random access resource may be used to indicate a corresponding uplink BWP, and thus the first mapping relationship may be used to indirectly indicate the mapping relationship between uplink BWPs and downlink BWPs.

It should be understood that the mapping relationship between uplink BWPs and downlink BWP is only an example. Of course, uplink BWPs and downlink BWPs may have other mapping relationships, as long as the first mapping relationship can be used to determine a downlink BWP to which a uplink BWP is mapped, or to determine an uplink BPW to which a downlink BWP is mapped. Embodiments do not imposes specific limitations on this.

According to embodiments, when it is determined that the currently active uplink BWP does not correspond to the currently active downlink BWP according to the first mapping relationship, that is, the currently active uplink and downlink BWP are not uplink and downlink BWPs having a mapping relationship with each other (denoted as case 1), or the currently active uplink BWP does not correspond to any downlink BWP (denoted as case 2), the terminal device and the network device can reach an agreement on the downlink BWP for RAR. Case 2 can be considered as a kind of case 1, and for ease of description, two cases are described below.

Case 1

In some embodiments, determining, by the terminal device, the target downlink BWP according to the first uplink BWP and a first mapping relationship includes:

when it is determined that the first uplink BWP is mapped to a first downlink BWP according to the first mapping relationship, and the first downlink BWP is not a currently active downlink BWP for the terminal device, determining, by the terminal device, the first downlink BWP as the target downlink BWP.

That is, when the first downlink BWP currently active for the terminal device is not the downlink BWP to which the currently active first uplink BWP is mapped, the terminal device may determine the downlink BWP to which the first uplink BWP is mapped as the target downlink BWP. Further, the currently active downlink BWP may be switched to the target downlink BWP, and random access is performed between the first downlink BWP and the target downlink BWP.

Correspondingly, when the network device receives Msg1 on the first uplink BWP, the network device can reply RAR on the first downlink BWP to which the first uplink BWP is mapped, so that the terminal device receives the RAR on the first downlink BWP.

In other embodiments, determining, by the terminal device, the target downlink BWP according to the first uplink BWP and a first mapping relationship includes:

when it is determined that the first uplink BWP is mapped to a first downlink BWP according to the first mapping relationship, and the first downlink BWP is not a currently active downlink BWP for the terminal device, determining, by the terminal device, an initial downlink BWP as the target downlink BWP.

That is to say, when the first downlink BWP currently active for the terminal device is not the downlink BWP to which the currently active first uplink BWP is mapped, the terminal device can determine the initial downlink BWP as the target downlink BWP. Further, the currently active downlink BWP can be switched to the initial downlink BWP, and random access is performed on the first uplink BWP and the initial downlink BWP.

Correspondingly, when the network device receives Msg1 on the first uplink BWP, the network device can reply RAR on the initial downlink BWP, so that the terminal device receives the RAR on the initial downlink BWP.

In some embodiments, the terminal device may switch the currently active first uplink BWP to an initial uplink BWP, and perform random access on the initial uplink BWP and the target downlink BWP. Embodiments of the present disclosure do not impose specific limitations on this.

For example, when the first mapping relationship is as shown in FIG. 3, the currently active uplink BWP is the uplink BWP2, and the currently active downlink BWP is the downlink BWP1, that is, the uplink BWP and the downlink BWP do not have a mapping relationship with each other.

In this case, the terminal device can switch the currently active downlink BWP1 to the downlink BWP0 to which the uplink BWP2 is mapped, so that the switched downlink BWP0 and the currently active uplink BWP2 have a mapping relationship with each other, and then the terminal device can perform random access on the uplink BWP2 and the downlink BWP0. When the network device receives Msg1 on the uplink BWP2, the network device can send RAR on the downlink BWP0 to which the uplink BWP2 is mapped, and accordingly, the terminal device can receive the RAR on the downlink BWP0.

Alternatively, the terminal device may switch the currently active downlink BWP1 to the initial downlink BWP, and then the terminal device may perform random access on the uplink BWP2 and the initial downlink BWP. When the network device receives Msg1 on the uplink BWP2, RAR is sent on the initial downlink BWP, and accordingly, the terminal device can receive the RAR on the initial downlink BWP. In this case, it can be considered that the uplink BWP2 and the initial downlink BWP have a mapping relationship with each other.

Case 2

In some embodiments, determining, by the terminal device, the target downlink BWP according to the first uplink BWP and a first mapping relationship includes:

when it is determined that the first uplink BWP is not mapped to any downlink BWP according to the first mapping relationship, determining, by the terminal device, an initial downlink BWP as the target downlink BWP.

In other words, the currently active first uplink BWP is not mapped to any downlink BWP. In this case, it can be considered that the currently active uplink BWP and the downlink BWP do not have a mapping relationship with each other. For example, the terminal device may determine the initial downlink BWP as the target downlink BWP, so that the currently active downlink BWP can be switched to the initial downlink BWP, and random access is performed on the first uplink BWP and the initial downlink BWP.

Correspondingly, when the network device receives Msg1 on the first uplink BWP and determines that the first uplink BWP is not mapped to any downlink BWP, the network device can reply RAR on the initial downlink BWP, and the terminal device receives RAR on the initial downlink BWP.

Figure 4:
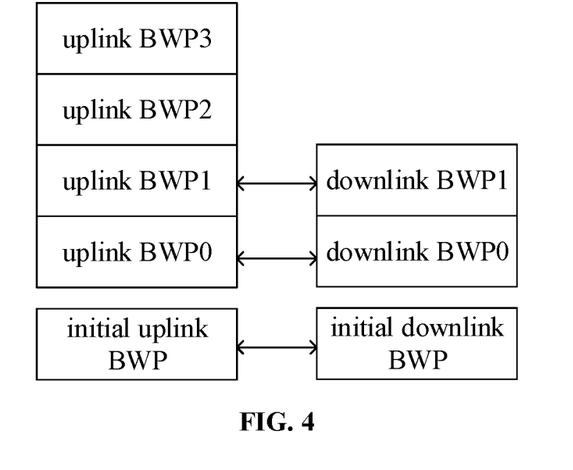
FIG. 4 is a schematic diagram showing another example of the first mapping relationship according to an embodiment of the present disclosure.

For example, the first mapping relationship is shown in FIG. 4, the uplink BWP0 is mapped to the downlink BWP0, the uplink BWP1 is mapped to the downlink BWP1, the uplink BWP2 and uplink BWP3 are not mapped to any downlink BWP, and the initial uplink BWP is mapped to the initial downlink BWP.

When the currently active uplink BWP is the uplink BWP2, and the currently active downlink BWP is the downlink BWP1, the uplink BWP and the downlink BWP do not have a mapping relationship with each other.

In this case, the terminal device can switch the currently active downlink BWP1 to the initial downlink BWP, and then the terminal device can perform random access on the uplink BWP2 and the initial downlink BWP. When the network device receives Msg1 on the uplink BWP2, the network device can send the RAR on the initial downlink BWP, and accordingly, the terminal device can receive the RAR on the initial downlink BWP. In this case, the uplink BWP2 and the initial downlink BWP can be considered to have a mapping relationship with each other.

In embodiments of the present disclosure, when the terminal device determines to switch the currently active downlink BWP to the initial downlink BWP, the terminal device may also determine to switch the currently active uplink BWP to the initial uplink BWP. Further, random access can be performed on the initial uplink BWP and the initial downlink BWP.

In summary, when the currently active first uplink BWP and the currently active first downlink BWP do not correspond (for example, case 1 and case 2), the terminal device may determine to switch the currently active downlink BWP to the downlink BWP to which the first uplink BWP is mapped, or to switch to the initial downlink BWP, and then random access is performed on the first uplink BWP and the downlink BWP to which the first uplink BWP is mapped, or random access is performed on the first uplink BWP and the initial downlink BWP. Alternatively, the terminal device may switch the currently active first uplink BWP to the initial uplink BWP, that is, the terminal device may perform random access on the initial uplink BWP and the downlink BWP to which the first uplink BWP is mapped, or the terminal device may perform random access on the initial uplink BWP and the initial downlink BWP.

In some embodiments, the method 200 may further include:

receiving, by the terminal device, a first switching instruction sent by a network device, wherein the first switching instruction is used to instruct the terminal device to switch a currently active first uplink BWP to a second uplink BWP;

according to the first mapping relationship, determining, by the terminal device, a downlink BWP to which the second uplink BWP is mapped;

switching, by the terminal device, the currently active first uplink BWP to the second uplink BWP, and switching a currently active downlink BWP to the downlink BWP to which the second uplink BWP is mapped.

In some embodiments, the method 200 further includes:

receiving, by the terminal device, a second switching instruction sent by a network device, wherein the second switching instruction is used to instruct to switch a currently active first downlink BWP to a second downlink BWP;

according to the first mapping relationship, determining, by the terminal device, an uplink BWP to which the second downlink BWP is mapped;

switching, the terminal device, the currently active first downlink BWP to the second downlink BWP, and switching a currently active uplink BWP to the uplink BWP to which the second downlink BWP is mapped.

Therefore, when the terminal device performs BWP switching, it can simultaneously perform uplink and downlink BWP switching according to the first mapping relationship, so as to maintain the simultaneously active uplink BWP and downlink BWP as the BWPs having a mapping relationship with each other, and increase the probability of successful RAR reception.

For example, when the currently active uplink BWP is the uplink BWP1 and the currently active downlink BWP is the downlink BWP1, the network device instructs the terminal device to switch the uplink BWP to the uplink BWP2 which is mapped to the downlink BWP0. The terminal device may switch the uplink BWP from the uplink BWP1 to the uplink BWP2, and at the same time switch the downlink BWP from the downlink BWP1 to the downlink BWP0.

Figure 5:
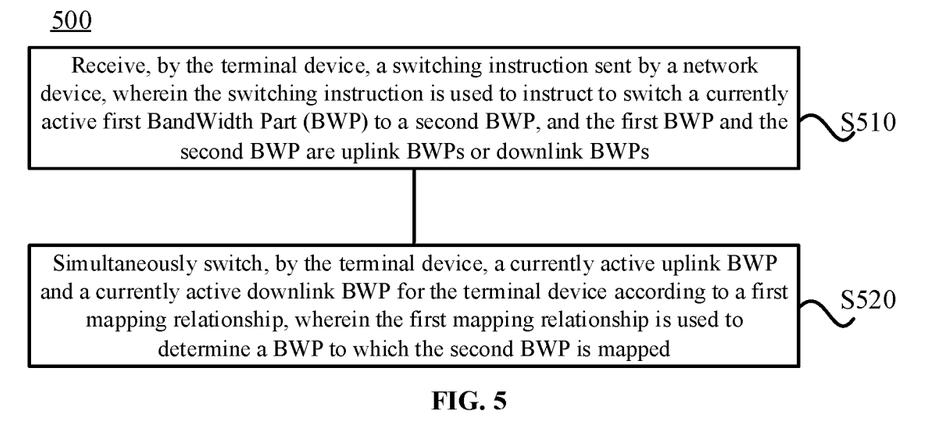
FIG. 5 shows a schematic flowchart of a method for random access according to an embodiment of the present disclosure.

FIG. 5 is a schematic flowchart of a method 500 for random access according to an embodiment of the present disclosure. The method 500 may be performed by a terminal device in the communication system shown in FIG. 1. As shown in FIG. 5, the method 500 includes the following steps:

In S510, the terminal device receives a switching instruction sent by a network device. The switching instruction is used to instruct to switch a currently active first BandWidth Part (BWP) to a second BWP, and the first BWP and the second BWP are uplink BWPs or downlink BWPs.

In S520, the terminal device simultaneously switches a currently active uplink BWP and a currently active downlink BWP for the terminal device according to a first mapping relationship. The first mapping relationship is used to determine a BWP to which the second BWP is mapped.

For example, when the currently active uplink BWP is the uplink BWP1, and the currently active downlink BWP is the downlink BWP1, the network device 700 instructs the terminal device to switch the uplink BWP to the uplink BWP2 which is mapped to the downlink BWP0. The terminal device may switch the uplink BWP from the uplink BWP1 to the uplink BWP2, and at the same time, switch the downlink BWP from the downlink BWP1 to the downlink BWP0.

That is, the terminal device can simultaneously switch the uplink and downlink BWPs according to the first mapping relationship, thereby ensuring that the switched uplink and downlink BWPs are uplink and downlink BWPs which have the mapping relationship with each other. In this way, the terminal device and the network device reach an agreement on the downlink BWP for transmitting the RAR, and this is helpful to increase the probability for the terminal device to successfully receive the RAR.

In some embodiments, S520 may include:

when the first BWP and the second BWP are uplink BWPs, switching, by the terminal device, the currently active uplink BWP from the first BWP to the second BWP, and switching the currently active downlink BWP to a downlink BWP to which the second BWP is mapped.

In some embodiments, S520 may include:

when the first BWP and the second BWP are downlink BWPs, switching, by the terminal device, the currently active downlink BWP from the first BWP to the second BWP, and switching the currently active uplink BWP to an uplink BWP to which the second BWP is mapped.

In some embodiments, the first mapping relationship is a mapping relationship between uplink BWPs and downlink BWPs.

In some embodiments, the first mapping relationship is a mapping relationship between BWP indices of the uplink BWPs and BWP indices of the downlink BWPs.

In some embodiments, when the number of the uplink BWPs and the number of the downlink BWPs are equal, the BWP indices K of the uplink BWPs are mapped to the BWP indices k of the downlink BWPs, where K and k are both integers and K=k.

In some embodiments, when the number of uplink BWPs is greater than the number of downlink BWPs, the BWP indices K of the uplink BWPs are mapped to the BWP indices k of the downlink BWPs, where K and k are both integers, k is a result of K modulo M, and M is the number of downlink BWPs configured by a network device.

In some embodiments, the first mapping relationship is a mapping relationship between downlink BWPs and random access resources configured on uplink BWPs.

In some embodiments, the first mapping relationship is a mapping relationship between the random access resources and BWP indices of the downlink BWPs.

It should be understood that the first mapping relationship may be the first mapping relationship described above, and details about the first mapping relationship can be found the previous descriptions, which will not be repeated here.

The method embodiments of the present disclosure are described in detail above with reference to FIGS. 2 to 5. The device embodiments of the present disclosure are described in detail below with reference to FIGS. 6 to 9. It should be understood that the device embodiments and the method embodiments correspond to each other and details regarding the device embodiments can be found in the previous description about the method embodiments.

Figure 6:
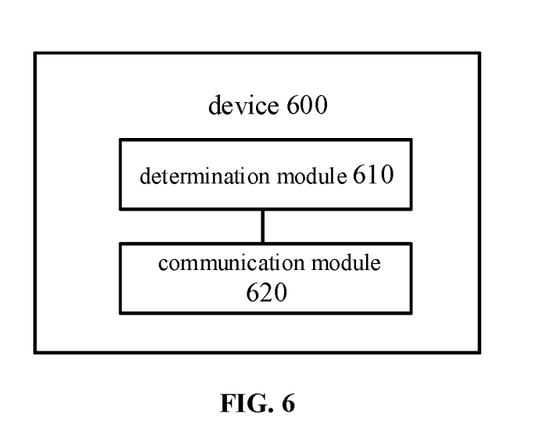
FIG. 6 shows a schematic block diagram of a device for random access according to an embodiment of the present disclosure.

FIG. 6 shows a schematic block diagram of a device 600 for random access according to an embodiment of the present disclosure. As show in FIG. 6, the device 600 includes a determination module 610 and a communication module 620.

The determination module 610 is configured to determine a target uplink BandWidth Part (BWP) and/or a target downlink BWP for random access.

The communication module 620 is configured to perform a contention-based random access on the target uplink BWP and/or the target downlink BWP.

In some embodiments, the determination module 610 is further configured to: determine the target downlink BWP according to a currently active first uplink BWP.

In some embodiments, the determination module 610 is further configured to: determine the target downlink BWP according to the first uplink BWP and a first mapping relationship, wherein the first mapping relationship is used to determine a downlink BWP to which the first uplink BWP is mapped.

In some embodiments, the determination module 610 is further configured to:

when it is determined that the first uplink BWP is not mapped to any downlink BWP according to the first mapping relationship, determine an initial downlink BWP as the target downlink BWP.

In some embodiments, In some embodiments, the determination module 610 is further configured to:

when it is determined that the first uplink BWP is mapped to a first downlink BWP according to the first mapping relationship, and the first downlink BWP is not a currently active downlink BWP for the terminal device, determine the first downlink BWP as the target downlink BWP.

In some embodiments, the determination module 610 is further configured to:

when it is determined that the first uplink BWP is mapped to a first downlink BWP according to the first mapping relationship, and the first downlink BWP is not a currently active downlink BWP for the terminal device, determine an initial downlink BWP as the target downlink BWP.

In some embodiments, the determination module 610 is further configured to:

determine a currently active downlink BWP as the target downlink BWP.

In some embodiments, the determination module 610 is further configured to:

determining, by the terminal device, a currently active uplink BWP or an initial uplink BWP as the target uplink BWP.

In some embodiments, the communication module 620 is further configured to:

receive a first switching instruction sent by a network device, wherein the first switching instruction is used to instruct the device to switch a currently active first uplink BWP to a second uplink BWP;

the determination module 610 is further configured to, according to the first mapping relationship, determine a downlink BWP to which the second uplink BWP is mapped;

the device 600 further includes a switching module configured to switch the currently active first uplink BWP to the second uplink BWP, and switch a currently active downlink BWP to the downlink BWP to which the second uplink BWP is mapped.

In some embodiments, the communication module 620 is further configured to:

receive a second switching instruction sent by a network device, wherein the second switching instruction is used to instruct to switch a currently active first downlink BWP to a second downlink BWP;

the determination module 610 is further configured to, according to the first mapping relationship, determine an uplink BWP to which the second downlink BWP is mapped;

the device 600 further includes a switching module configured to switch the currently active first downlink BWP to the second downlink BWP, and switch a currently active uplink BWP to the uplink BWP to which the second downlink BWP is mapped.

In some embodiments, the first mapping relationship is a mapping relationship between uplink BWPs and downlink BWPs.

In some embodiments, the first mapping relationship is a mapping relationship between BWP indices of the uplink BWPs and BWP indices of the downlink BWPs.

In some embodiments, when the number of the uplink BWPs and the number of the downlink BWPs are equal, the BWP indices K of the uplink BWPs are mapped to the BWP indices k of the downlink BWPs, where K and k are both integers and K=k.

In some embodiments, when the number of uplink BWPs is greater than the number of downlink BWPs, the BWP indices K of the uplink BWPs are mapped to the BWP indices k of the downlink BWPs, where K and k are both integers, k is a result of K modulo M, and M is the number of downlink BWPs configured by a network device.

In some embodiments, the first mapping relationship is a mapping relationship between random access resources configured on uplink BWPs and downlink BWPs.

In some embodiments, the first mapping relationship is a mapping relationship between the random access resources and BWP indices of the downlink BWPs.

In some embodiments, the communication module 620 is configured to:

send a random access preamble on the target uplink BWP through a random access resource configured on the target uplink BWP; and receive a Random Access Response (RAR) sent by a network device on the target downlink BWP.

In some embodiments, the device 600 further includes:

a switching module configured to, when a currently active downlink BWP for the terminal device is different from the target downlink BWP, switch the currently active downlink BWP to the target downlink BWP.

It should be understood that the device 600 for random access according to the embodiments of the present disclosure may correspond to the terminal device in the method embodiments of the present disclosure, and the above and other operations and/or functions of each unit in the device 600 are configured for the purpose of implementing corresponding processes performed by the terminal device in the method 200 shown in FIG. 2, and repeated descriptions are omitted for brevity.

Figure 7:
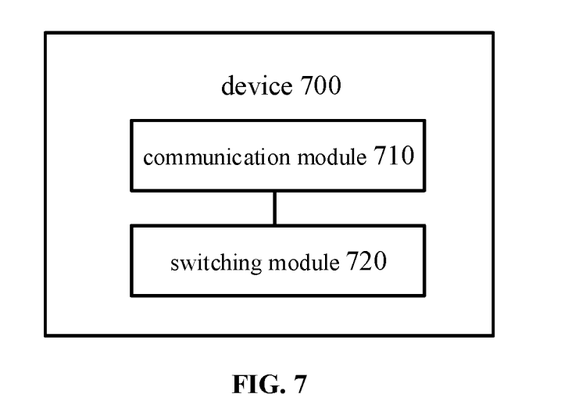
FIG. 7 shows a schematic block diagram of a device for random access according to another embodiment of the present disclosure.

FIG. 7 shows a schematic block diagram of a device for random access according to another embodiment of the present disclosure. The device 700 in FIG. 7 includes a communication module 710 and a switching module 720.

The communication module 710 is configured to receive a switching instruction sent by a network device. The switching instruction is used to instruct to switch a currently active first BandWidth Part (BWP) to a second BWP, and the first BWP and the second BWP are uplink BWPs or downlink BWPs.

The switching module 720 is configured to simultaneously switch a currently active uplink BWP and a currently active downlink BWP for the terminal device according to a first mapping relationship, wherein the first mapping relationship is used to determine a BWP to which the second BWP is mapped.

In some embodiments, the switching module is configured to:

when the first BWP and the second BWP are uplink BWPs, switch the currently active uplink BWP from the first BWP to the second BWP, and switch the currently active downlink BWP to a downlink BWP to which the second BWP is mapped.

In some embodiments, the switching module is configured to:

when the first BWP and the second BWP are downlink BWPs, switch the currently active downlink BWP from the first BWP to the second BWP, and switch the currently active uplink BWP to an uplink BWP to which the second BWP is mapped.

In some embodiments, the first mapping relationship is a mapping relationship between uplink BWPs and downlink BWPs.

In some embodiments, the first mapping relationship is a mapping relationship between BWP indices of the uplink BWPs and BWP indices of the downlink BWPs.

In some embodiments, when the number of the uplink BWPs and the number of the downlink BWPs are equal, the BWP indices K of the uplink BWPs are mapped to the BWP indices k of the downlink BWPs, where K and k are both integers and K=k.

In some embodiments, when the number of uplink BWPs is greater than the number of downlink BWPs, the BWP indices K of the uplink BWPs are mapped to the BWP indices k of the downlink BWPs, where K and k are both integers, k is a result of K modulo M, and M is the number of downlink BWPs configured by a network device.

In some embodiments, the first mapping relationship is a mapping relationship between random access resources configured on uplink BWPs and downlink BWPs.

In some embodiments, the first mapping relationship is a mapping relationship between the random access resources and BWP indices of the downlink BWPs.

The device 700 may correspond to (for example, may be configured in or itself is) the terminal device described in the above method 500, and each module or unit in the device 700 is used to perform each of the operations performed by the terminal device in the above method 500, and repeated descriptions are omitted for brevity.

Figure 8:
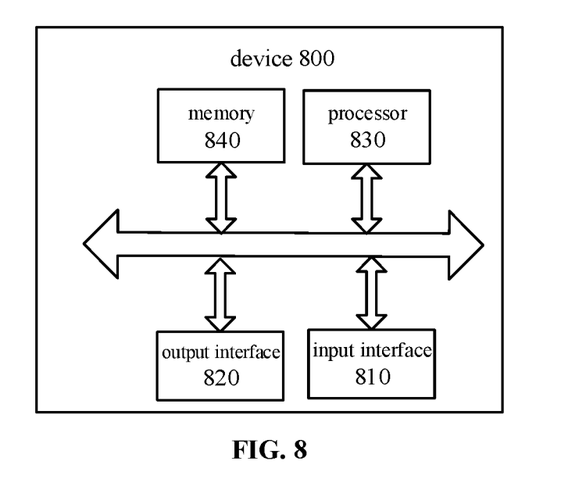
FIG. 8 shows a schematic block diagram of a device for random access according to an embodiment of the present disclosure.

As shown in FIG. 8, an embodiment of the present disclosure further provides a device 800 for random access. The device 800 may be the device 600 in FIG. 6, and can be used to perform operations in the method 200 in FIG. 2 which are performed by the terminal device. The device 800 includes an input interface 810, an output interface 820, a processor 830, and a memory 840. The input interface 810, the output interface 820, the processor 830, and the memory 840 may be connected through a bus system. The memory 840 is used to store programs, instructions or codes. The processor 830 is configured to execute the programs, instructions, or codes in the memory 840 to control the input interface 810 to receive signals, control the output interface 820 to send signals, and complete operations in the foregoing method embodiments.

It should be understood that, in the implementations of the present disclosure, the processor 830 may be a Central Processing Unit (CPU), and the processor 830 may also be other general-purpose processors, Digital Signal Processor (DSP), Application Specific Integrated Circuit (ASIC), Field Programmable Gate Array (FPGA) or other programmable logic device, discrete gate or transistor logic device, discrete hardware component, and so on. The general purpose processor may be a microprocessor or the processor may be any conventional processor or the like.

The memory 840 can include read only memory and random access memory and provides instructions and data to the processor 830. A portion of the memory 840 may also include a non-volatile random access memory. For example, the memory 840 can also store information of the device type.

During implementation, contents of the foregoing methods can be completed by an integrated hardware logic circuit in the processor 830, or software instructions. The contents of the methods disclosed in the implementations of the present disclosure can be directly completed by a hardware processor, or by a combination of hardware and software modules in the processor. The software modules can be located in a storage medium that is well-known in the art such as a random access memory, a flash memory, a read only memory, a programmable read only memory or an electrically erasable programmable memory, a register. The storage medium is located in the memory and the processor 830 reads information in the memory 840 and completes the contents of the above-described methods with its hardware. For brevity, details are not provided here.

In an exemplary embodiment, the determination module 610 and the switching module included in the device 600 in FIG. 6 may be implemented using the processor 830 in FIG. 8, and the communication module 620 included in the device 600 in FIG. 6 may be implemented using the input interface 810 and the output interface 820.

Figure 9:
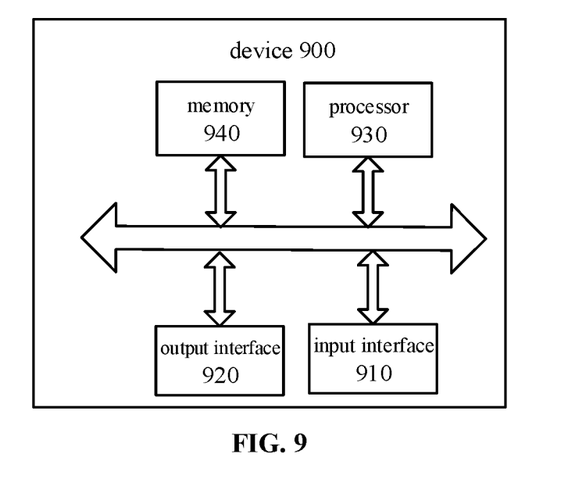
FIG. 9 shows a schematic block diagram of a device for random access according to an embodiment of the present disclosure.

As shown in FIG. 9, an embodiment of the present disclosure further provides a device 900 for random access. The device 900 may be the device 700 in FIG. 7, and can be used to perform operations in the method 500 in FIG. 5 which are performed by the terminal device. The device 900 includes an input interface 910, an output interface 920, a processor 930, and a memory 940. The input interface 910, the output interface 920, the processor 930, and the memory 940 may be connected through a bus system. The memory 940 is used to store programs, instructions or codes. The processor 930 is configured to execute the programs, instructions, or codes in the memory 940 to control the input interface 910 to receive signals, control the output interface 920 to send signals, and complete operations in the foregoing method embodiments.

It should be understood that, in the implementations of the present disclosure, the processor 930 may be a Central Processing Unit (CPU), and the processor 930 may also be other general-purpose processors, Digital Signal Processor (DSP), Application Specific Integrated Circuit (ASIC), Field Programmable Gate Array (FPGA) or other programmable logic device, discrete gate or transistor logic device, discrete hardware component, and so on. The general purpose processor may be a microprocessor or the processor may be any conventional processor or the like.

The memory 940 can include read only memory and random access memory and provides instructions and data to the processor 930. A portion of the memory 940 may also include a non-volatile random access memory. For example, the memory 940 can also store information of the device type.

During implementation, contents of the foregoing methods can be completed by an integrated hardware logic circuit in the processor 930, or software instructions. The contents of the methods disclosed in the implementations of the present disclosure can be directly completed by a hardware processor, or by a combination of hardware and software modules in the processor. The software modules can be located in a storage medium that is well-known in the art such as a random access memory, a flash memory, a read only memory, a programmable read only memory or an electrically erasable programmable memory, a register. The storage medium is located in the memory and the processor 930 reads information in the memory 940 and completes the contents of the above-described methods with its hardware. For brevity, details are not provided here.

In an exemplary embodiment, the switching module 710 included in the device 700 in FIG. 7 may be implemented using the processor 930 in FIG. 9, and the communication module 720 included in the device 700 in FIG. 7 may be implemented using the input interface 910 and the output interface 920.

Embodiments of the present disclosure also provide a computer-readable storage medium that stores one or more programs, the one or more programs include instructions, and when the instructions are executed by a portable electronic device including multiple application programs, the portable electronic device can be caused to perform the methods of the embodiments shown in FIGS. 2 to 5.

An embodiment of the present disclosure also provides a computer program including instructions. When the computer program is executed by a computer, the computer can execute the corresponding flow of the methods in the embodiments shown in FIGS. 2 to 5.

Those of ordinary skill in the art will appreciate that the exemplary units and algorithm steps described according to the implementations disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method implementations.

In the implementations provided in the present disclosure, it should be understood that the disclosed systems, devices and methods may be implemented in other ways. For example, the device implementations described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the implementations.

In addition, the functional units in the implementations of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the implementations of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for random access, comprising:
   determining, by a terminal device, a target downlink BandWidth Part (BWP) for random access according to a first uplink BWP and a first mapping relationship, wherein the first uplink BWP is a currently active uplink BWP, and the first mapping relationship is used to determine a downlink BWP to which the first uplink BWP is mapped; and
   performing, by the terminal device, a contention-based random access on the first uplink BWP and the target downlink BWP;
   wherein the first mapping relationship is a mapping relationship between BWP indices of uplink BWPs and BWP indices of downlink BWPs; and
   when the number of the uplink BWPs and the number of the downlink BWPs are equal, the BWP indices K of the uplink BWPs are mapped to the BWP indices k of the downlink BWPs, where K and k are both integers and K=k;
   wherein determining, by the terminal device, the target downlink BWP according to the first uplink BWP and the first mapping relationship comprises:
   when it is determined that the first uplink BWP is not mapped to any downlink BWP according to the first mapping relationship, determining, by the terminal device, an initial downlink BWP as the target downlink BWP.

2. The method according to claim 1, wherein determining, by the terminal device, the target downlink BWP according to the first uplink BWP and the first mapping relationship further comprises:
   when it is determined that the first uplink BWP is mapped to a first downlink BWP according to the first mapping relationship, and the first downlink BWP is not a currently active downlink BWP for the terminal device, determining, by the terminal device, the first downlink BWP as the target downlink BWP.

3. The method according to claim 1, wherein determining, by the terminal device, the target downlink BWP according to the first uplink BWP and the first mapping relationship further comprises:
   when it is determined that the first uplink BWP is mapped to a first downlink BWP according to the first mapping relationship, and the first downlink BWP is not a currently active downlink BWP for the terminal device, determining, by the terminal device, an initial downlink BWP as the target downlink BWP.

4. The method according to claim 1, further comprising:
   when a currently active downlink BWP for the terminal device is different from the target downlink BWP, switching, by the terminal device, the currently active downlink BWP to the target downlink BWP.

5. The method according to claim 1, further comprising:
   when a currently active downlink BWP for the terminal device and the first uplink BWP have the first mapping relationship with each other, the terminal not performing downlink BWP switching.

6. The method according to claim 1, further comprising:
   when the first uplink BWP is an initial uplink BWP and a currently active downlink BWP for the terminal device is not an initial downlink BWP, switching, by the terminal device, the currently active downlink BWP to the initial downlink BWP.

7. A terminal device for random access, comprising:
   a processor;
   a memory; and
   a plurality of instructions stored in the memory that, when executed by the processor, cause the terminal device to:
   determine a target downlink BandWidth Part (BWP) for random access according to a first uplink BWP and a first mapping relationship, wherein the first uplink BWP is a currently active uplink BWP, and the first mapping relationship is used to determine a downlink BWP to which the first uplink BWP is mapped; and
   perform a contention-based random access on the first uplink BWP and the target downlink BWP;
   wherein the first mapping relationship is a mapping relationship between BWP indices of uplink BWPs and BWP indices of downlink BWPs; and
   when the number of the uplink BWPs and the number of the downlink BWPs are equal, the BWP indices K of the uplink BWPs are mapped to the BWP indices k of the downlink BWPs, where K and k are both integers and K=k;
   wherein the processor is further configured to:
   when it is determined that the first uplink BWP is not mapped to any downlink BWP according to the first mapping relationship, determine an initial downlink BWP as the target downlink BWP.

8. The terminal device according to claim 7, wherein the processor is further configured to:
   when it is determined that the first uplink BWP is mapped to a first downlink BWP according to the first mapping relationship, and the first downlink BWP is not a currently active downlink BWP for the terminal device, determine the first downlink BWP as the target downlink BWP.

9. The terminal device according to claim 7, wherein the processor is further configured to:
   when it is determined that the first uplink BWP is mapped to a first downlink BWP according to the first mapping relationship, and the first downlink BWP is not a currently active downlink BWP for the terminal device, determine an initial downlink BWP as the target downlink BWP.

10. The terminal device according to claim 7, wherein the processor is further configured to:
when a currently active downlink BWP for the terminal device is different from the target downlink BWP, switch the currently active downlink BWP to the target downlink BWP.

11. The terminal device according to claim 7, wherein the processor is further configured to:
when a currently active downlink BWP for the terminal device and the first uplink BWP have the first mapping relationship with each other, not perform downlink BWP switching.

12. The terminal device according to claim 7, wherein the processor is further configured to:
when the first uplink BWP is an initial uplink BWP and a currently active downlink BWP for the terminal device is not an initial downlink BWP, switching, by the terminal device, the currently active downlink BWP to the initial downlink BWP.

* * * * *